INVENTORS
GILBERT A. ASER
JOHN W. MELVILLE
GORDON P. TAILLIE
BY

ATTORNEY

INVENTORS
GILBERT A. ASER
JOHN W. MELVILLE
GORDON P. TAILLIE
BY
ATTORNEY

INVENTORS
GILBERT A. ASER
JOHN W. MELVILLE
GORDON P. TAILLIE
BY

ATTORNEY

United States Patent Office 3,221,622
Patented Dec. 7, 1965

3,221,622
OPTICAL SCANNING SYSTEM
Gilbert A. Aser, 327 Kimberly Drive, Rochester, N.Y.;
John W. Melville, 33 Lincolnshire Road, Webster, N.Y.;
and Gordon Philip Taillie, 146 Forest Hills Road, Rochester, N.Y.
Filed Dec. 23, 1963, Ser. No. 332,653
2 Claims. (Cl. 95—1.7)

This invention relates in general to xerography and, in particular, to an optical scanning apparatus for projecting the image of a stationary object onto a moving xerographic plate.

More specifically, the invention relates to an improved image projecting apparatus that is particularly adapted for use in xerographic reproducing machines, and is also suitable for use with comparable types of devices.

In the process of xerography, for example, as disclosed in either Carlson Patent 2,297,671, issued October 6, 1942, or in Carlson Patent 2,357,809, issued September 12, 1944, a xerographic plate, comprising a layer of photoconductive insulating material on a conductive backing, is given a uniform electric charge over its surface and is then exposed to the subject matter to be reproduced, usually by conventional projection techniques. This exposure discharges the plate areas in accordance with the radiation intensity which reaches them and thereby creates an electrostatic latent image on or in the plate coating.

Development of the image is effected with developer material or developers which comprise, in general, a mixture of a suitable pigmented or dyed electroscopic powder, hereinafter referred to as toner, and a granular carrier material, which latter functions to carry and to generate triboelectric charges on the toner. More exactly, the function of the granular material is to provide the mechanical control to the powder, or to carry the powder to an image surface and, simultaneously, to provide almost complete homogeneity of charge polarity. In the development of the image, the toner powder is brought into surface contact with the coating and is held thereon electrostatically in a pattern corresponding to the electrostatic latent image. Thereafter, the developed xerographic image is usually transferred to a support or transfer material to which it may be fixed by any suitable means.

Since the disclosure of the basic concept of xerography by Carlson, a variety of machines and devices have been proposed to incorporate such teachings in a manner to form copy xerographically on a commercial basis. For the most part, each of such devices has been specifically designed to the solution of a particular reproduction problem and, for the most part, has been limited to the particular use intended.

It is therefore the principal object of this invention to improve optical scanning apparatus for use in automatic xerographic apparatus in which a reusable xerographic plate may successively be charged, exposed and developed, and in which the developed image may readily be transferred to a sheet of transfer material, such as paper or similar material, and thereby permit continuous reuse of the xerographic plate.

Another object of this invention is to improve optical scanning apparatus for scanning various size copy, whether single sheet copy, book copy or three-dimensional copy.

A further object of this invention is to improve optical scanning apparatus to permit the use of a stationary original in a moving light-receiving surface type copying apparatus.

For a better understanding of the invention as well as other objects and further features thereof, reference is had to the following detailed description of the invention to be read in connection with the accompanying drawings, wherein.

Figure 1:
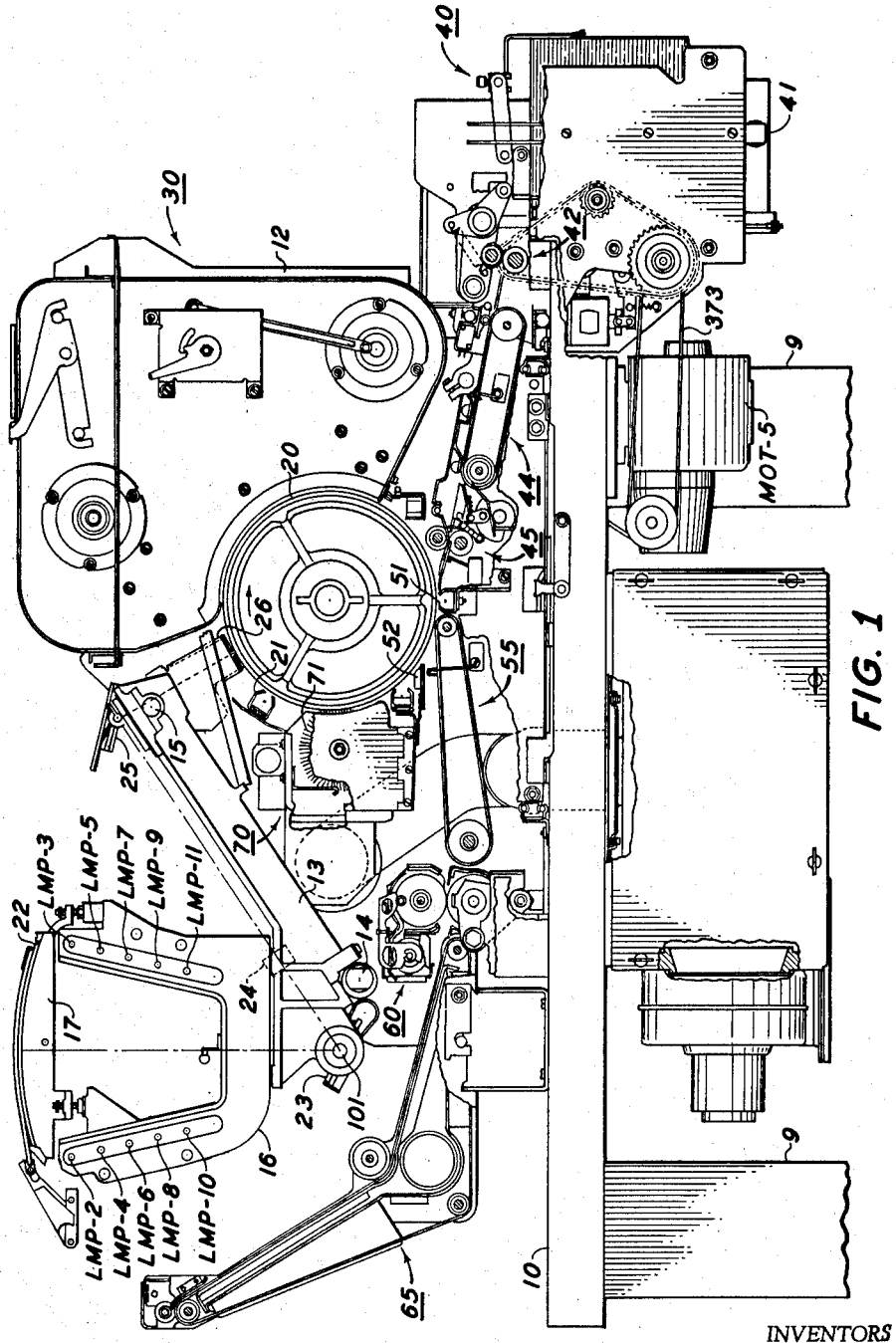
FIG. 1 illustrates schematically a preferred embodiment of a xerographic apparatus having an optical system of the invention.

As shown schematically in FIG. 1, the automatic xerographic reproducing apparatus comprises a xerographic plate 20 including a photoconductive layer or light-receiving surface on a conductive backing and formed in the shape of a drum, which is mounted on a shaft journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally, as follows:

A charging station, at which a uniform electrostatic charge is deposited on the photoconductive layer of the xerographic drum;

An exposure station, at which a light or radiation pattern of copy to be reproduced is projected onto the drum surface to dissipate the drum charge in the exposed areas thereof and thereby form a latent electrostatic image of the copy to be reproduced;

A developing station, at which a xerographic developing material including toner particles having an electrostatic charge opposite to that of the electrostatic latent image are cascaded over the drum surface, whereby the toner particles adhere to the electrostatic latent image to form a xerographic powdered image in the configuration of the copy being reproduced;

A transfer station, at which the xerographic powder image is electrostatically transferred from the drum surface to a transfer material or a support surface; and A drum cleaning and discharge station, at which the drum surface is brushed to remove residual toner particles remaining thereon after image transfer, and at which the drum surface is exposed to a relatively bright light source to effect substantially complete discharge of any residual electrostatic charge remaining thereon.

The charging station is preferably located, as indicated by reference character A. As shown, the charging arrangement includes a corona charging device 21 which includes a corona discharge array of one or more corona discharge electrodes that extend transversely across the drum surface and are energized from a high potential source and are substantially closed within a shielding member.

Next subsequent thereto in the path of motion of the xerographic drum is an exposure station B. An optical scanning or projection system is provided to project a flowing image onto the surface of the photoconductive drum from a stationary original.

The optical scanning or projection assembly comprises a stationary copyboard which consists of a transparent curved platen member 22 such as, for example, a glass plate or the like, positioned on the exterior of the cabinet, which is adapted to support a document to be reproduced, the document being uniformly illuminated and arranged in light projection relations to the moving light-receiving surface of the xerographic drum. Uniform lighting is provided by banks of lamps LMPS arranged on opposite sides of the copyboard. Scanning of the document on the stationary copyboard is accomplished by means of a mirror assembly which is oscillated relative to the copyboard in timed relation to the movement of the xerographic drum.

The mirror assembly, which includes an object mirror 23, is mounted below the copyholder to reflect an image of the document through a lens 24 onto an image mirror 25 which, in turn, reflects the image onto the xerographic drum through a slot in a fixed light shield 26 positioned adjacent to the xerographic drum surface.

Referring now to the subject matter of the invention, the exposure mechanism is used to scan the object to be reproduced and to project a flowing image thereof onto the rotating xerographic drum. In the embodiment of the invention shown, the scanning of the object, such as a document or book, placed on a copy platen is accomplished by means of an oscillating object mirror which reflects an image from the object through a lens onto an image mirror which, in turn, reflects the image through a slotted light shield onto the xerographic drum.

The exposure mechanism includes an optical frame 13 for supporting the object mirror, lens and image mirror. The optical frame 13 is supported at one end by support bar 14 secured to and extending between frames 11 and 12 and at its opposite end by pin support 15 secured to frame 12. Attached to the optical frame, adjacent to the object mirror, is a lamp holder frame assembly 16 which, in turn, supports a platen support frame assembly 17.

The platen 22, made of transparent material, such as glass, is suitably attached to the platen support frame assembly directly over the axis of rotation of the object mirror 23. Platen 22 is curved in the shape of an arc, with the radius thereof equal to the distance from the platen surface to the axis of rotation of the object mirror 23.

A document or other object to be reproduced placed on the curved platen 22 is uniformly illuminated by banks of lights, such as fluorescent lamps LMP–2, LMP–3, LMP–4, LMP–5, LMP–6, LMP–7, LMP–8, LMP–9, LMP–10, and LMP–11 mounted in conventional fluorescent lamp holders secured to the lamp holder frame assembly 16.

Object mirror 23 is supported by a suitable mirror support assembly fixed to mirror shaft 101 journaled by suitable bearings mounted in optical frame 13. A detailed description of the mirror support assembly is not deemed pertinent to a complete understanding of the invention, it being noted that this assembly positions the mirror in a flattened portion of the shaft so that the reflecting surface of the mirror is in a plane extending through the axis of shaft 101.

The shaft 101, and therefore the object mirror 23, are oscillated by means of a cam 102 secured to the inboard end of the shaft for movement therewith. Motion in one direction of the cam is effected by means of a tape 103 secured at one end to cam 102 and at its other end to a cam 104 driven in synchronization with the rotation of the xerographic drum, as described in detail hereinafter. Motion of cam 102 in the opposite direction, or the return motion of the cam, is effected by means of spring 105 connected at one end to pin 106 fixed to the cam and at its other end to pin 107 secured in optical frame 13.

Both the lens 24 and the image mirror 25 are secured in a suitable manner in fixed position on the optical frame 13 in the optical path from object mirror 23.

The light shield 26 is simply an open, elongated box having side walls, end walls and a bottom wall provided with a narrow slot 27 extending across the length of the light shield. Light shield 26 is secured to the optical frame and is positioned with its bottom wall in close proximity to the peripheral surface of the drum and with the center line of the slot parallel to the axis of rotation of the drum. In the embodiment shown, the light shield supports the corona charging device 21.

The xerographic drum 20 is mounted on horizontal driven shaft 111 that rotates in bearings 112 and 113 positioned in drum drive casing 114 secured to the outer face of inboard frame 12 with a portion of the drum drive casing extending through a suitable opening in frame 12 toward frame 11. The free end or outboard end of shaft 111 is threaded to receive thumb nut 115 to secure the inboard hub of the xerographic drum into driven engagement with the pin 108 of drive collar 109 secured to the shaft for rotation therewith. The openings in the drum drive casing to receive the shaft 111 are closed at one end by cover 116 and at the opposite end by bearing retaining cap 117 supporting seal 118 encircling the shaft.

The shaft 111 is operatively connected to the main drive motor M–3 of the apparatus by worm gear 121 on the end of the motor shaft engaging gear 122 which, in turn, drives gear 123 fixed to shaft 111 by key 124. The gear 123 is maintained in axial alignment thereon by washer 128 and by bearing nut 125 threaded onto the end of the shaft to force the washer 128 to contact bearing 113 which abuts against one side of the hub of gear 123, the opposite side of the gear being positioned against a shoulder formed on the shaft 111.

Gear 122 is fixed to one end of shaft 126 journaled in bearings 127 mounted in the drum drive casing. The opposite end of shaft 126 extends from the drum drive casing through seal 131 and bearing retaining cap 132 beyond the outboard face of inboard frame 12 and has fixed at the end thereof sprocket 133 for a purpose to be described.

To effect a scanning cycle of the object mirror 23, there is fixed to the gear 123 on drum shaft 111 a cam 134 having in the embodiment shown, three cam lobes, that is, three rise portions and three fall portions. The mirror actuating came 102, as previously described, has one end of tape 103 secured thereto. The tape extends over tape guide 136 fixed to frame 12 and is secured at its opposite end to a second cam 104 fixed to one end of shaft 141.

The opposite end of shaft 141 is provided with a cam arm 142, fixed thereon, which carries a cam follower 143 adapted to engage cam 134. Shaft 141 is journaled by bearings 144 mounted in the drum drive housing in spaced apart relation by cylindrical spacers 137 and 138 and secured therein by seal bearing retaining cap 145 provided with seal 147 and bearing retaining nut 146 and washer 148.

With this arrangement, the object mirror is oscillated three times to scan an image during each revolution of the drum and in synchronization with the rotation therewith, since it is driven during the scanning cycle directly from the drum shaft as the cam follower 143 follows the rise portion on cam 134 secured to the drum shaft. Return motion of the mirror to its start-of-scan position is effected by the biasing action of spring 105 and this return motion is effected rapidly because of the shape of the fall portion of cam 134, it being apparent that the spring 105 will always bias cam follower 143 into cooperative engagement with cam 134.

The two cams 102 and 104 have equal radii and this makes the angular velocity of the cam arm 142 equal to the angular velocity of the rotating object mirror 23. The cam 134 and the drum 20 are mounted on the same shaft making their angular velocity equal. Since the angular velocity of the cam 134 and the drum are equal, any deviation from constant angular velocity of the drum shaft will not be a factor in the synchronization of the optical system, because any deviation of the angular velocity of the drum would be synchronized with a proportionate deviation in the angular velocity of the scanning mirror, that is, object mirror 23, through the drum shaft, cams, and the interconnecting tape.

The xerographic drum 20, and the object mirror during the scanning cycles are driven in synchronization with each other by means of main drive motor MOT–3. Since the movement of a copy sheet, such as paper, to and from the drum must also be synchronized with the peripheral surface speed of the drum, the paper transport 44 and elements associated therewith, such as feed rollers 601 and 602, endless conveyor 55, fuser or fixing device 60 and inclined conveyor 65 are also driven by main drive motor M–3.

Figure 2:
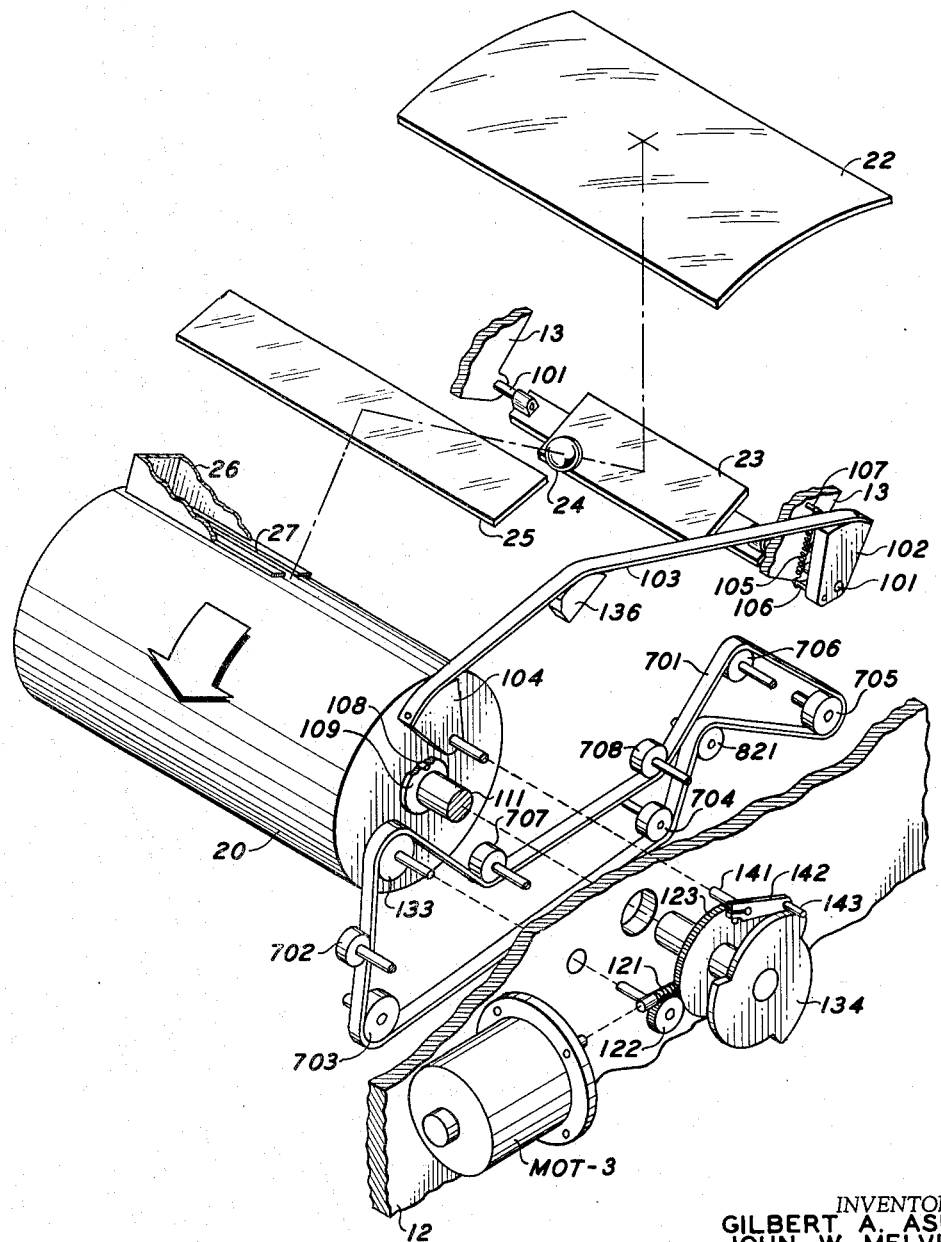
FIG. 2 is a perspective view of the optical system of the invention and the top drive for the various inoperative elements associated with the xerographic drum.
Figure 3:
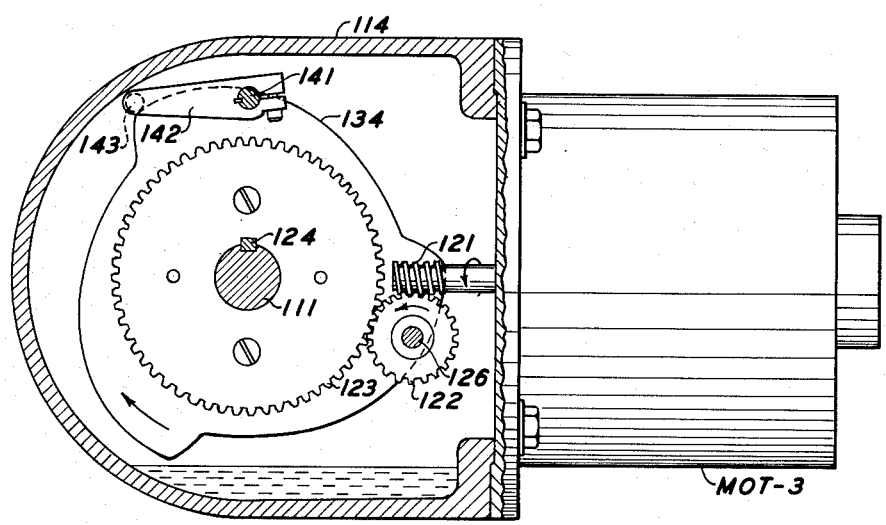
FIG. 3 is a rear view of the drum drive mechanism with the rear cover broken away to show the arrangement of the various drive elements used in synchronizing the improved optical scanning system.
Figure 4:
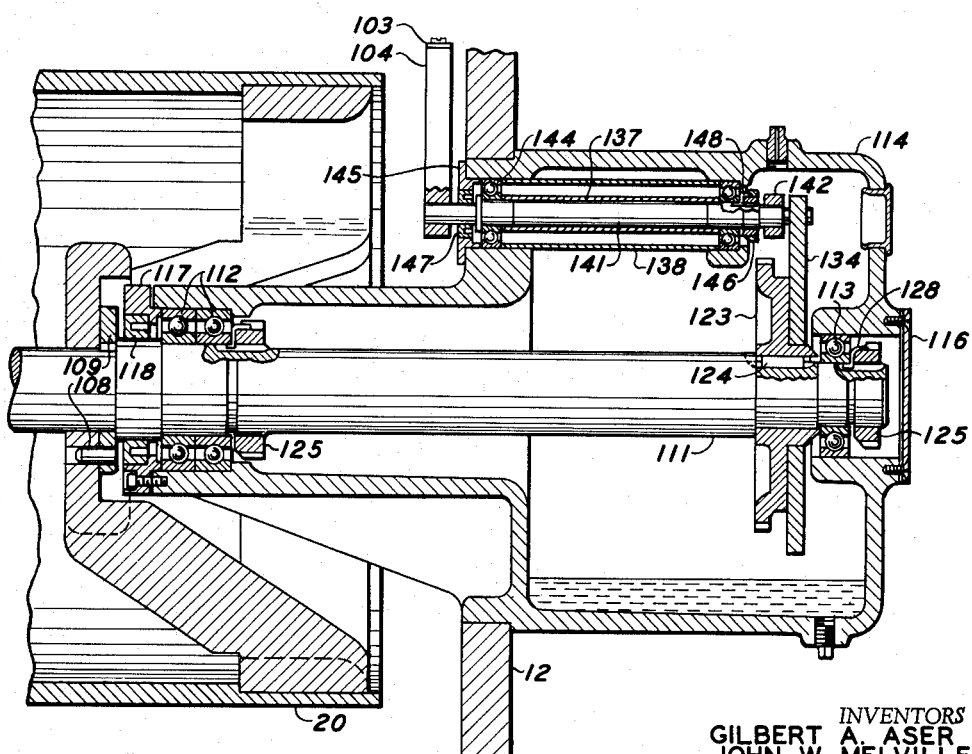
FIG. 4 is a sectional view of the drum drive mechanism to better illustrate the synchronization of the improved optical scanning system with the rotating xerographic plate.

As shown schematically in FIG. 2, each of these components is operatively connected to the sprocket 133 driven by the main drive motor which also drives the drum, as previously described. These components are operatively connected to sprocket 133 by chain 701 extending from sprocket 133 over an idler sprocket 702 around sprocket 703 to sprocket 704, then around a sprocket 821 to drive the heat fuser 60, around a sprocket 705 to drive inclined conveyor 65, over an idler sprocket 706, then into engagement with idler sprockets 707 and 708 back up to sprocket 133. Idler sprockets 702 and 706 are adjustably secured to inboard frame 12, while idler sprockets 707 and 708 are fixed collar sprockets.

While the invention has been described with reference to the structures disclosed herein, it is not confined to the details set forth, and this application is intended to cover such modifications or changes as may come within the purposes of the improvements or the scope of the appended claims.

What is claimed is:

1. Apparatus for projecting a light image of a document onto a moving light receiving surface, said apparatus including:
    a frame,
    a curved copy board secured to said frame for supporting a document,
    illuminating means positioned to illuminate a document supported by said curved copy board,
    a horizontal driven shaft journaled in said frame,
    a xerographic drum mounted on said shaft for rotation therewith,
    a light shield interposed in the optical path between said copy board and said xerographic drum,
    a slot aperture in said light shield adjacent said xerographic drum and extending transversely to the path of rotation of said xerographic drum,
    a second shaft journaled in said frame with the axis of said second shaft parallel to said horizontally driven shaft,
    an object mirror secured to said second shaft for movement therewith,
    a lens,
    an image mirror,
    said lens and said image mirror being secured to said frame to form an optical path from said object mirror to said slot aperture in said light shield,
    a first cam fixed to said horizontally driven shaft,
    cam follower means positioned to engage said first cam,
    a second cam fixed to said cam follower means for actuation thereby,
    a third cam fixed to said second shaft,
    and tape means connected to said second cam and to said third cam whereby as said xerographic drum is rotated, said object mirror will be oscillated in synchronization with the rotative speed of said xerographic plate.

2. The apparatus of claim 1 including biasing means to effect oscillatory movement of said third cam in one direction and to bias said cam follower means into engagement with said first cam.

No references cited.

EVON C. BLUNK, *Primary Examiner.*

UNITED STATES PATENT OFFICE
CERTIFICATE OF CORRECTION

Patent No. 3,221,622                      December 7, 1965

Gilbert A. Aser et al.

It is hereby certified that error appears in the above numbered patent requiring correction and that the said Letters Patent should read as corrected below.

In the grant, line 3, after "Rochester, New York," insert -- assignors to Xerox Corporation, of Rochester, New York, a corporation of New York, --; lines 12 and 13, for "Gilbert A. Aser, John W. Melville and Gordon Philip Taillie, their heirs " read -- Xerox Corporation, its successors --; in the heading to the printed specification, lines 3 to 6, for "Gilbert A. Aser, 327 Kimberly Drive, Rochester, N. Y.; John W. Melville, 33 Lincolnshire Road, Webster, N. Y.; and Gordon Philip Taillie, 146 Forest Hills Road, Rochester, N. Y." read -- Gilbert A. Aser, Rochester, N. Y., John W. Melville, Webster, N. Y., and Gordon Philip Taillie, Rochester, N. Y., assignors to Xerox Corporation, Rochester, N. Y., a corporation of New York --; column 1, line 19, for "2,297,671" read -- 2,297,691 --; column 2, line 72, for "projection relations" read -- projecting relation --; column 4, line 36, for "came" read -- cam --.

Signed and sealed this 20th day of December 1966.

(SEAL)
Attest:

ERNEST W. SWIDER                      EDWARD J. BRENNER
Attesting Officer                   Commissioner of Patents